May 29, 1928.
J. R. VANDIVIER
1,671,797
UNITARY ACCELERATOR AND BRAKE CONTROLLER
Filed Aug. 13, 1926
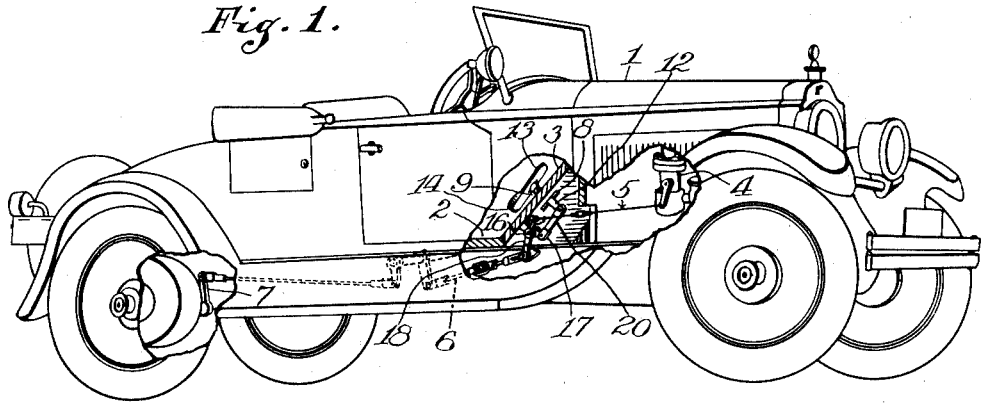
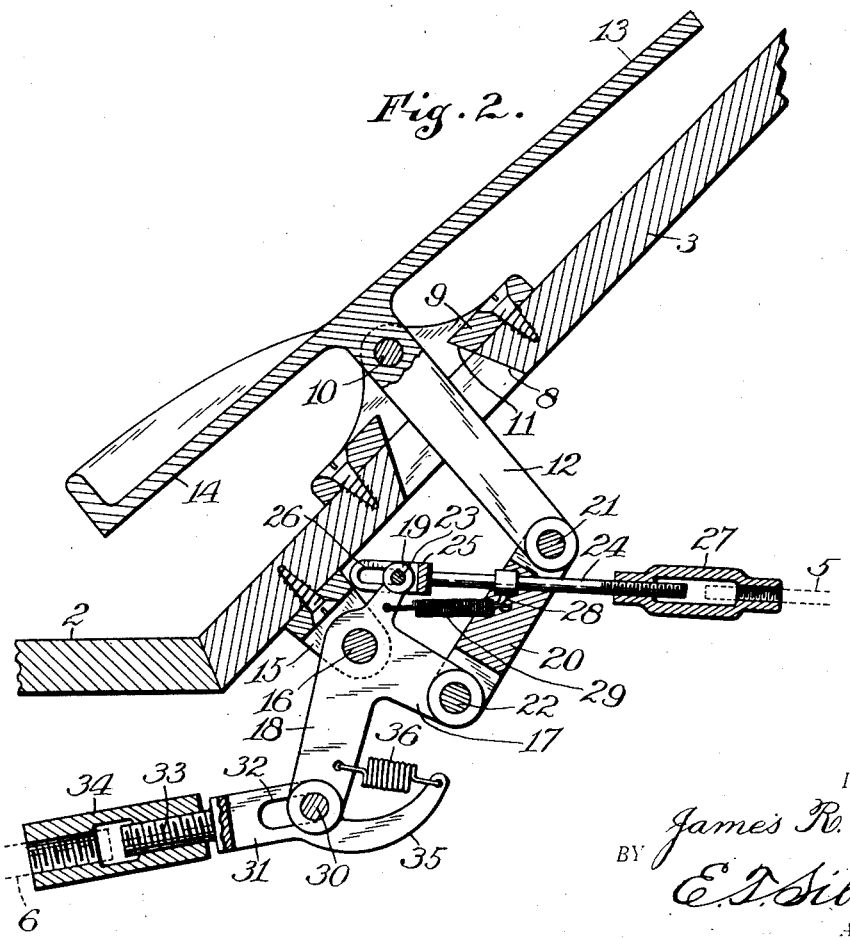
INVENTOR:
James R. Vandivier
BY
E. T. Silvius,
ATTORNEY.

Patented May 29, 1928.

1,671,797

UNITED STATES PATENT OFFICE.

JAMES RIEHL VANDIVIER, OF FRANKLIN, INDIANA.

UNITARY ACCELERATOR AND BRAKE CONTROLLER.

Application filed August 13, 1926. Serial No. 129,045.

This invention relates to apparatus for use in motor-vehicles to enable the driver thereof to control the speed of the vehicle reliably, the invention having reference more particularly to apparatus whereby to enable the driver or operator to control acceleration and retardation of the motor-vehicle without requiring the shifting of the feet from one to another of separate control devices, such as pedals or devices required to be pushed, in the operation of a motor-vehicle.

An object of the invention is to provide reliable means for operating and controlling accelerator devices and brake devices in such manner as to tend to safety in operation, by avoiding accidents which result from the operator or driver becoming confused when attempting either to accelerate the speed or to apply the brakes.

Another object is to provide a unitary accelerator and brake controller which shall be of such construction as to enable an automobile driver to promptly control speed, by alternate use of the accelerator device and the brake device without necessitating confusing movements of the driver's foot from one to another separate control device.

A further object is to provide means for coupling an accelerator controlled rod with a service brake control rod, and means to operate the same by foot power so as to be instantaneous.

A still further object is to provide a unitary accelerator and brake controller appliance which shall be of such construction as to be adapted to be readily applied to a motor-vehicle, and be cheaply connected to the accelerator rod and the brake rod commonly used in motor-vehicles, which controller apparatus shall be such as to permit manufacture at small cost, and shall be durable and economical in use.

With the above-mentioned and other objects in view, the invention consists in a plurality of co-operating devices connected together and adapted to be applied as a controlling unit to a motor-vehicle and in a novel manner, the controller appliance including means to be operated by an operator's foot constantly applied thereto; and the invention consists further in the novel parts, and in the combinations and arrangements of parts, as hereinafter particularly described and further defined in the accompanying claims.

Referring to the drawings,—Figure 1 is a perspective view of an automobile partially broken away and exposing the controller applied thereto; and Fig. 2 is a sectional elevation reproducing the principal parts of the invention on an enlarged scale.

Similar reference characters in the different figures of the drawings indicate corresponding elements or features of construction herein referred to in detail.

In the drawings the numeral 1 designates an automobile generally and 2 the floor having an inclined portion 3 within reach of the driver's feet, the automobile having a suitable carbureter 4 suitably provided with a push rod 5 which hitherto has been operated by a suitable foot lever arranged on the floor of the vehicle body. The numeral 6 designates the brake rod which commonly is connected with the service brake pedal to be operated by foot power for operating the brake levers 7. For the purpose of the present invention a slot 8 is cut in the floor portion 3.

A practical embodiment of the invention comprises a pivot block 9 adapted to be secured upon the floor portion 3 and being provided with a pivot pin 10, the block havign an opening 11 therein which is in practice a continuation of the slot 8. A lever arm 12 is connected to the pin 10 and in practice extends through the slot 8, the arm having a pedal plate 13 on its upper end to move the arm in one direction and having also a pedal plate 14 to move the arm in the opposite direction. The pedal devices preferably are composed of a single plate rigidly connected to the arm 12 so as to constitute practically a rocker lever having two opposite arms, being suitably designed for foot power operation. A pivot block 15 is provided and reversely arranged relatively to the block 9 and in practice is secured to the under side of the floor portion 3, the block being provided with a pivot pin 16. A coupling lever is provided which has three arms 17, 18 and 19 and is supported on the pivot pin 16, and the arm 17 is connected to the arm 12 by means of a stiff link 20 and pivot pins 21 and 22. The arm 19 is provided with a pivot pin 23 for an accelerator rod connection. Preferably an adapter is provided which comprises a short rod 24 having a jaw 25 on one end thereof receiving the end portion of the arm 19, the jaw blades having slots 26 receiving the pivot pin 23. The opposite end of the adapter rod 24 preferably is provided with a turnbuckle 27 whereby to connect it to the rod 5, the latter being suitably modified for the purpose by cutting away the end portion hitherto provided with a separate operating device. Preferably the rod 24 is provided with a side lug 28, and a coil spring 29 is connected to the lug and to the arm 19 to normally keep the pin 23 at one end of the slots in the jaw 25, to insure instant movement of the accelerator rod when required. The arm 18 is provided with a pivot pin 30 for the brake connections and a jaw 31 having slots 32 receives the pivot pin, the jaw being designed as an adapter and having a rod 33 thereon adapted to be connected to the brake rod 6, preferably by means of a turnbuckle 34, the brake rod being adapted for the purpose by cutting away the end portion hitherto connected to the conventional foot pedal. One blade of the jaw 31 preferably has a finger 35 on its end and to which a coil spring 36 is connected, the spring being connected also to the lever 18 so as to normally retain the pin 30 at one end of the slots 32. As may be seen, the slots 26 permit the brakes to be applied without moving the accelerator rod and the slots 32 permitting the accelerator rod to be operatively pushed with out disturbing the brake rod.

In practical use the driver or operator places his heel on the brake 14 and the forward portion of his foot on the plate 13 and simply pushes slightly on the lever portion 13 in order to push and operate the accelerator rod while the spring 36 tends to hold the foot lever in neutral position, assisted slightly by the weaker spring 29. When braking is required the operator simply pushes on the lever plate 14, thereby reversing the movement of the arm 12 and the coupling lever arms, resulting in the arm 18 pulling the brake rod 6 forward and applying the brakes.

What is claimed as new is:

1. An accelerator and brake controller having a rocker lever and a coupling-lever linked together and provided each with a pivot to support it, the coupling-lever having an accelerator rod connection device and a brake rod connection device.

2. An accelerator and brake controller having a coupling-lever provided with a pivot to support it and provided also with a plurality of arms to operate the accelerator and the brake respectively; and a rocker lever operatively connected with the coupling-lever and provided with a pivot to support it.

3. An accelerator and brake controller having two pivot blocks, and two levers linked together and pivoted to the blocks respectively, one of the levers having an accelerator-operating arm and a brake-operating arm, the other of the levers being provided with two foot-plates to move the lever alternately in opposite directions.

4. A controller having two pivot blocks reversely arranged, a foot-lever pivoted to one of the blocks, a coupling-lever pivoted to the other of the blocks and connected with the foot-lever to be operated thereby, and two series of means to connect an accelerator rod and a brake rod respectively to the coupling-lever.

5. A unitary accelerator and brake controller comprising a pivot block, a rocker lever pivoted adjacent to one end thereof to the pivot block and having two opposite foot lever plates connected thereto adjacent to the block to move the rocker lever alternately in opposite directions, a stiff link pivoted to the rocker lever at the opposite end thereof, a coupling-lever having an arm pivotally connected to said link and having also two oppositely-extending arms to alternately operate an accelerator rod and a brake rod respectively, and a pivot block arranged reversely to the other pivot block and having connections to pivotally support the coupling-lever.

6. In an accelerator and brake controller, the combination of a pivot block, a coupling-lever having two motion-reversing arms and an operating-arm and pivoted to said block, a rocker lever having connection with said operating-arm and provided with a pivot for its support, an adapter for connection with an accelerator rod having limited sliding connection with one of the motion-reversing arms, and an adapter for connection with a brake rod having limited sliding connection with the other one of the motion-reversing arms.

In testimony whereof I affix my signature on the 7th day of August, 1926.

JAMES RIEHL VANDIVIER.